May 7, 1968            J. E. WALSTROM            3,381,940
HIGH-SPEED WELL LOGGING SYSTEM
Filed April 3, 1967                          2 Sheets-Sheet 1
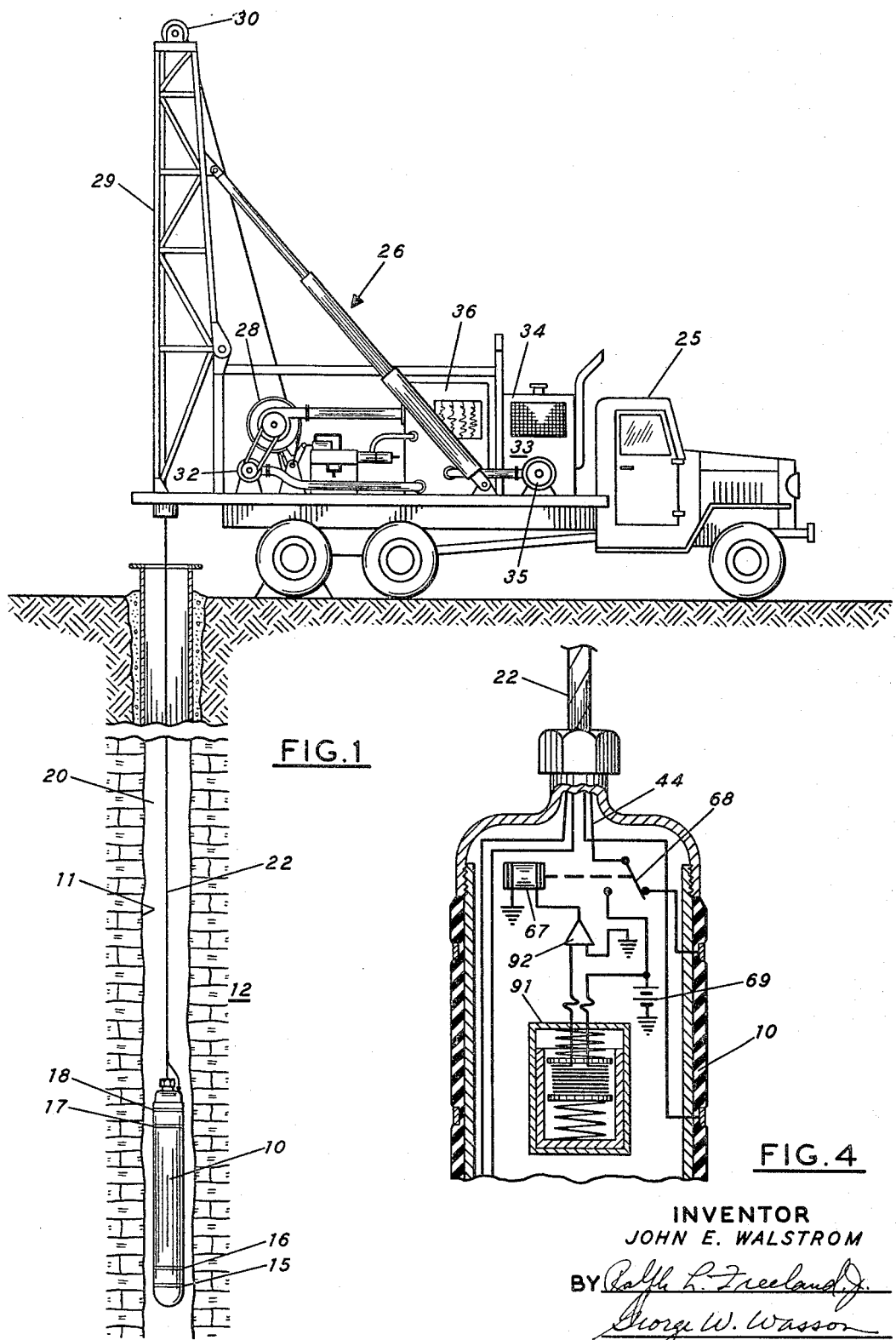
INVENTOR
JOHN E. WALSTROM
BY Ralph L. Freeland Jr.
George W. Wasson
ATTORNEYS

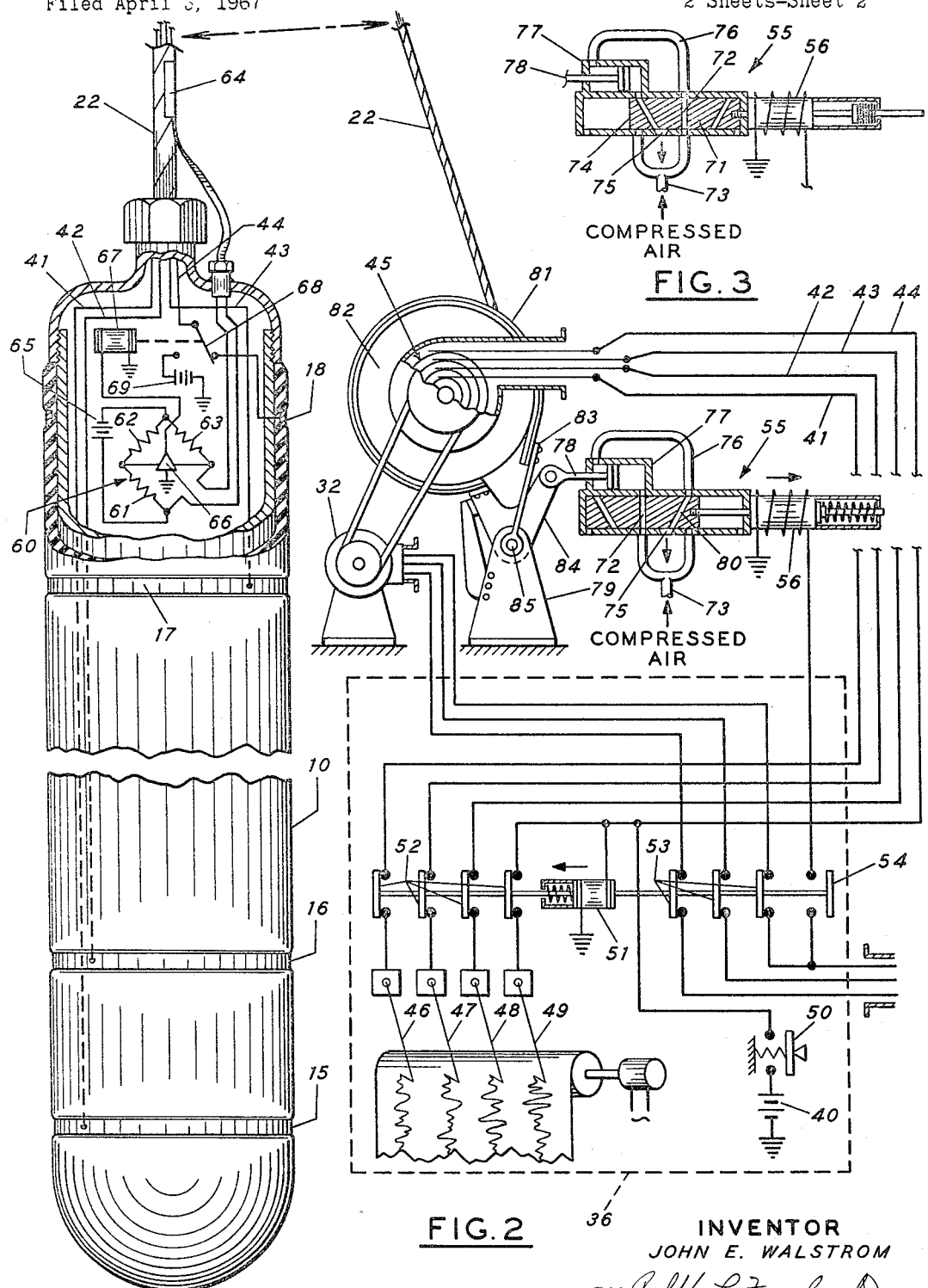

United States Patent Office 3,381,940
Patented May 7, 1968

3,381,940
HIGH-SPEED WELL LOGGING SYSTEM
John E. Walstrom, Orinda, Calif., assignor to Chevron Research Company, San Francisco, Calif., a corporation of Delaware
Filed Apr. 3, 1967, Ser. No. 627,878
10 Claims. (Cl. 254—173)

ABSTRACT OF THE DISCLOSURE

A control system for permitting an increase in speed of hoisting a well logging tool through a well bore. A sensing device is associated within the well bore with the logging sonde and is included in an electrical control circuit connected through the logging cable to the hoisting mechanism at the earth's surface. Strains detected within the well bore at the logging sonde are substantially instantaneously transmitted along the cable to control the hoisting mechanism. Higher speeds of hoisting may now be used because of the speed of control on the hoisting mechanism when a strain is detected at the tool or logging cable.

---

The present invention relates to well logging. More particularly, it relates to a method of high-speed well logging wherein a logging sonde may be traversed rapidly through a well bore with little danger of breaking the cable should the sonde become snagged in the well bore during such high-speed operations.

THE PROBLEM

Well logging is the process of developing data concerning the earth formation penetrated by a well. The log of a well is used to identify characteristics of the earth formation and to detect the presence of oil, water or gas along the formations. It has long been known that it is possible to sense at high speeds the electrical and electromagnetic measurements needed to develop the log of the formation; that is, to sense rapid variations in these measurements and to sense these variations while moving at high speeds through the well. The electrical measurements can be made virtually instantaneously and are not changed by the rate at which the measuring instrument is moved past the earth formation containing the fluid. However, in practice, a logging sonde containing the elements for sensing the measured quantities traverses the borehole at a rather slow speed, say, 100 feet per minute, because of the possibility of snagging the sonde at sand bridges, projections or other irregularities in the well bore.

Also, it is often necessary to log at rather slow speeds so that the galvanometer recording system can adequately follow the voltage and current variations and thereby produce an accurate recording. However, it is now possible to record magnetically and in digital form the electrical signals generated by the logging system. The dynamic range of such digital, magnetic tape recording greatly exceeds that available with sluggish galvanometer type systems. Accordingly, recording speed alone no longer limits logging speed.

Well logs are normally made in boreholes full of drilling fluid. Because this fluid is quite dense it is buoyant. To drop the logging sonde through the fluid, it must be weighted, and frequently the sonde will weigh as much as 500 pounds. Additionally, the logging cable may comprise several insulated electrical conductors and an outer steel armor, and is frequently 15,000 feet long. The cable must not only sustain the weight of the logging sonde but also its own weight over this length. The total mass transported through the well bore may then be many thousands of pounds.

In the cost of drilling an exploratory oil well, the cost of wire line logging may represent as much as 20% of the total cost. Of this total, up to 50% of the cost of each log is the time the drilling rig and drilling crew are waiting for the well log to be run. Accordingly, there is a substantial saving to be achieved on each logging run if it can be completed in a fraction of the time now required by the present logging rates.

THE INVENTION

In accordance with the present invention, there is provided a method and apparatus for preventing excessive tension on the well logging cable that might cause parting of the cable while pulling a logging sonde through a well bore at high speed. The method is accomplished by sensing abrupt changes in stress on the logging cable near the logging sonde. A signal representing stress on the cable is transmitted over the cable and in response to that signal a brake is applied to the surface hoisting equipment for the cable. Since the transmission of an electrical signal over the cable will be substantially instantaneous, the application of the brake to the hoisting equipment will remove the strain on the cable sufficiently ahead of any mechanical shock on the cable and prevent parting of the cable.

In a preferred form of apparatus for carrying out the method a strain gage is attached to the logging cable directly above the logging sonde. The gage is then used to generate a signal that closes a switching relay at the sonde and applies an electrical pulse over one of the conductors of the cable. This pulse is transmitted along the cable to an actuating circuit to deactivate the drive motor for the cable drum and to operate a mechanical brake at the surface.

In an alternate form, an abrupt change in velocity of the logging sonde is sensed by a seismometer or accelerometer positioned within the logging sonde. If the sonde becomes snagged, thus causing the abrupt change in velocity, a signal is instantaneously sent to the surface to stop the hoisting equipment.

At relatively great depths, these braking signals will arrive several seconds before any mechanical stress is applied to the cable. At shallow depths of a few hundred feet the velocity of withdrawal of the sonde can be reduced to a safe value without appreciably increasing the overall logging time.

Further objects and advantages of the present invention will become apparent from the following detailed description together with the drawings which form an integral part of this appplication.

DRAWINGS

FIGURE 1 is an elevational view, partially schematic, illustrating a well logging assembly embodying the present invention including the necessary hoisting equipment, a logging cable and the sonde illustrated within a well bore.

FIGURE 2 is a mechanical and electrical schematic diagram of the logging sonde and its associated transporting equipment illustrating the position of the electrical circuits for raising the logging sonde through a well bore.

FIGURE 3 is a view of the solenoid valve of FIGURE 2 with the valve in locking position for the braking mechanism.

FIGURE 4 is an alternative form of electrical sensing mechanism within the sonde as used in accordance with the present invention.

Referring now to the drawings, and in particular to FIGURE 1 wherein a logging sonde 10 is illustrated withing a well bore 11. The sonde here illustrated for example only takes the form of a four-electrode configuration useful in electrical logging. In the form shown the logging tool measures self-potential and three electrical resistivity quantities. As is well understood in the art, differences in measured voltages, or currents, will depend upon the formation fluids (water, oil or gas) and the lithology of earth formations 12 surrounding borehole 11. As illustrated herein, these measurements are produced at electrodes 15, 16, 17 and 18 mounted on sonde 10.

Sonde 10 is attached to a well logging cable 22 and weighted so as to drop to the bottom of well bore 11 through mud column 20. The sonde 10 is then continuously hoisted by cable 22 and rig 26 from the bottom of well bore 11 toward the earth's surface. Rig 26 includes truck 25 supporting cable reel 28 (sometimes supported on a separate truck, but illustrated here as part of a unitary hoisting and recording assembly), mast 29 and a crown pulley 30. Again for simplicity of illustration, drive of reel 28 is through an electric motor 32; however, in practice, the hoisting mechanism drive is usually an internal combustion engine operating through a multi-speed reduction gear drive. In the form illustrated here, speed control is through engine-generator unit 33 comprising engine 34 and generator 35. Generator 35 also supplies the necessary power for recording panel 36. Engine 34 further powers an air compressor (not shown) to supply pneumatic operating fluid to the brake mechanism.

FIGURE 2 illustrates the electrical interconnection of the downhole sensing elements of the logging sonde 10 and the uphole recording panel 36 and the mechanism for reeling the cable 22 in hoisting the sonde through the well bore. As here illustrated, cable 22 includes four conductors 41, 42, 43 and 44 connected to measuring elements within the sonde 10 and through brushes at slip rings 45 to recording elements within the recording panel 36 at the earth's surface. Conductor 41 is connected to a first electrode 15 and to recording pen 46, conductor 42 is connected to electrode 16 and to recording pen 47, conductor 43 is connected to electrode 17 and to recording pen 48, and conductor 44 is connected to electrode 18 and recording pen 49. Within the recording panel, each of the recording conductors is connected through one of the set of movable contacts 52 of solenoid operated switch 51. Interconnection of the sonde and the recorder is interrupted when the solenoid is operated.

Another set of movable contacts 53 of the solenoid operated switch 51 are in the power circuit to the electric motor 32 and a single normally open contact 54 is in the circuit to the braking operator 55 and to its operating solenoid 56. Energization of the solenoid switch 51 interrupts energization of the motor 32 and energizes solenoid 56 to actuate brake operator 55.

A bridge circuit 60 is provided within the sonde 10 for producing a signal announcing the existence of an undesired condition within the well bore. That signal is transmitted to the surface elements to interrupt energization of the hoisting mechanism and to cause the engagement of a braking mechanism on the cable reel. The downhole bridge circuit constitutes elements 61, 62, 63 and a strain gage 64 with a power source 65 supplied across the bridge at the junction between elements 62 and 63 and the junction of 61 and the strain gage 64. A sensing circuit and amplifier 66 is connected across the bridge at the junction of elements 62 and 61 and the junction of element 63 and the strain gage 64. The output of the amplifier is supplied to a solenoid 67 for the operation of a movable contact 68. The contact 68 in its normal position completes the circuit from sensing element 18 to conductor 44 and in its operated position connects the conductor 44 to a power source 69.

When the bridge becomes unbalanced a signal is produced to energize solenoid 67 and to operate contact 68; conductor 44 is then connected to a potential that will operate solenoid 51 at the earth's surface to cause contacts 52, 53 and 54 to be moved to an operated condition. In the operated condition the recorder pens are disconnected, the power is removed from the drive motor 32, and solenoid 56 is energized to operate the braking mechanism 55.

When operated by solenoid 56, the braking mechanism assumes the position as shown in FIGURE 3 by carrying the internal plunger 71 to a position to align port 72 with the source of compressed air from tube 73 and to align port 74 with a vent to atmosphere at 75. The compressed air from tube 73 passes through port 72 to tube 76 to apply pressure to the back side of the air chamber 77 to move rod 78 for operating the brake mechanism 79 (FIGURE 2). The brake mechanism 79 constitutes a brake band 81 wrapped around a brake drum 82 with one end of the band appropriately fixed at 83 and the movable end of the band connected to bell crank 84. The bell crank 84 is rotated about axis 85 by operation of the rod 78.

FIGURE 2 illustrates the unoperated position of the braking mechanism where compressed air tube 73 is connected to port 72 to apply pressure to the front side of the air chamber 77 while the back side of the air chamber is then connected through tube 76 to port 80 and to the atmosphere through vent 75. In this position the compressed air forces the brake band 81 to a released position with respect to drum 82.

The operation of the sonde transporting mechanism of the present invention is such that the sonde may be raised rapidly through the well bore as cable 22 is coiled onto reel 28. If the sonde 10 should become lodged or stuck within the well bore, the strain gage 64 would almost instantly sense the strain on cable 22 and cause an unbalance of the bridge circuit 60. That unbalance produces a signal that causes energization of solenoid 67 and movement of the contact 68 to connect potential source 69 to conductor 44. An electrical signal is then transmitted instantly to the solenoid 51 at the surface equipment causing opening of contacts 52 and 53 and closing of contacts 54. Through that action solenoid 56 becomes energized to cause application of the brake 81 to the drum 82. Opening of contacts 53 will have removed energization from the drive motor 32 to discontinue its operation. All of the foregoing operations will have taken place in a very short interval of time and so rapidly that the elastic limit of the cable 22 will not have been exceeded. The cable may elongate temporarily as the strain is applied from the stuck sonde, but the cable will not continue to be pulled so as to exceed its elastic limits.

An alternative form of sensing mechanism or device is shown in FIGURE 4 where a seismometer or accelerometer 91 is shown supported within the sonde 10 so that its output is connected through amplifier 92 to the solenoid coil 67. Any erratic movement of the sonde 10 as it is raised through the well bore as, for instance, if it were to become stuck, would cause the seismometer or accelerometer to move with respect to the sonde 10 because of its momentum. That movement would cause a signal to be applied through amplifier 92 to the solenoid 67. As in the case of the bridge circuit of FIGURE 2, the amplified signal would energize solenoid 67 and cause movement of contact 68 so as to connect battery 69 to conductor 44. The signal on conductor 44 would then be transmitted to the surface to initiate the operation as previously described with respect to FIGURE 2.

It should be understood that the four-electrode system shown in the drawings is merely illustrative of a tool for measuring electrical characteristics along a well bore and for producing a record chart of the characteristics measured. The techniques discussed herein would apply equally well to an electrical, induction-electrical, density, acoustic, or radioactivity logging system and to any system that is not otherwise speed-limited. The invention would be equally applicable to a speed-limited well logging system where the sonde must be transported at a slow or controlled speed through certain formation intervals but may be transported rapidly through other intervals. In such a system this invention could appreciably reduce the time the sonde was within the well. It should therefore be apparent that the invention disclosed herein is applicable to any logging system wherein electrical signals are transmitted along a cable from the sonde or tool within the well bore to recording devices at the earth's surface some place in the proximity of the hoisting mechanism employed to transport the sonde through the well bore.

Another form of signalling of a struck condition within the well bore would be to connect conductor 44 to a bell circuit so as to provide merely an audible signal at the surface of a downhole problem. The drive mechanism may then be manually stopped to interrupt the pull on the sonde cable.

The entire operation of the mechanism may be terminated by operation of the STOP switch 50 to connect battery 40 to the solenoid 51 and to cause operation as described with respect to FIGURE 2.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:
1. The method of preventing parting of a well logging cable while pulling a logging sonde through a well bore at high speed which comprises
   (a) sensing an abrupt change in stress on said cable adjacent to said sonde,
   (b) transmitting a signal in response to the sensed change in stress over said cable, and
   (c) immediately braking the hoisting equipment for said cable in response to said signal whereby the tension in said cable applied by said cable hoisting equipment is modified in response to said signal and sufficiently ahead of the transmission of the increased strain on said cable by said hoisting operation to prevent parting of said cable due to said abrupt change in stress.

2. In a well logging system wherein a well logging tool is hoisted through earth formations along a well bore on a well logging cable by a surface hoisting mechanism a method for anticipating mechanical shock along said cable due to said tool being snagged by engagement with said earth formations comprising the steps of:
   (a) hoisting said tool through said well bore at the lower end of a well logging cable,
   (b) sensing adjacent to said tool an abrupt change in stress on said cable,
   (c) generating a signal in said tool representing said change in stress,
   (d) transmitting said signal to the earth's surface over said cable, and
   (e) terminating said hoisting in response to said transmitted signal whereby said abrupt change in stress is anticipated and said hoisting terminated before the mechanical shock due to snagging of said tool in said well bore arrives at the earth's surface.

3. The method of claim 2 wherein said signal transmitted over said cable is employed to interrupt operation of the hoisting mechanism for said tool and to actuate a brake mechanism operable on said hoisting mechanism to prevent additional stress on said cable.

4. In a well logging apparatus including an interruptible hoisting mechanism for transporting a logging sonde at high speeds through a well bore on the end of a well logging cable, an apparatus for preventing the application of excessive stress on said well logging cable by said hoisting mechanism comprising:
   (a) means for sensing an abrupt change in the stress on said cable adjacent to said sonde within said well bore,
   (b) circuit means associated with said sonde within said well bore including said sensing means for generating a signal responsive to said change in stress on said cable,
   (c) means actuated by said circuit means for applying an electrical signal to said well logging cable for transmission to said hoisting mechanism,
   (d) and means at the top of said well bore operated by said electrical signal for substantially instantaneously interrupting operation of said hoisting mechanism.

5. The apparatus of claim 4 wherein said sensing means is a strain gage.

6. The apparatus of claim 5 wherein said circuit means is a bridge circuit including as one element said strain gage.

7. The apparatus of claim 4 wherein said means at the top of said well bore is a solenoid operated switch in the energization circuits of said hoisting mechanism and said electrical signal energizes said solenoid to cause interruption of said energization circuits.

8. The apparatus of claim 7 including a mechanical braking mechanism operated in response to energization of said solenoid and operative on said hoisting mechanism to prevent application of additional stress on said cable.

9. The apparatus of claim 4 wherein said sensing means is an element responsive to acceleration of said sonde.

10. The apparatus of claim 4 wherein said sensing means is a seismometer.

References Cited

UNITED STATES PATENTS

| | | | |
|---|---|---|---|
| 2,131,868 | 10/1938 | Bolton | 33—126.6 |
| 3,022,822 | 2/1962 | McStravick | 166—153 |
| 3,072,193 | 1/1963 | Ziegler | 166—65 |

EDWARD A. SROKA, *Primary Examiner.*

H. C. HORNSBY, *Assistant Examiner.*